(12) United States Patent
Dawson

(10) Patent No.: US 10,400,417 B1
(45) Date of Patent: Sep. 3, 2019

(54) GROUND STABILIZATION GRID

(71) Applicant: Charles Dawson, Baton Rouge, LA (US)

(72) Inventor: Charles Dawson, Baton Rouge, LA (US)

(73) Assignee: Dawson Holdings, LLC, Baton Rouge, LA (US)

( * ) Notice: Subject to any disclaimer, the term of this patent is extended or adjusted under 35 U.S.C. 154(b) by 0 days.

(21) Appl. No.: 15/921,090

(22) Filed: Mar. 14, 2018

(51) Int. Cl.
*E01C 9/00* (2006.01)
*E02D 29/02* (2006.01)
*E01C 5/20* (2006.01)

(52) U.S. Cl.
CPC ............... *E02D 29/02* (2013.01); *E01C 5/20* (2013.01)

(58) Field of Classification Search
CPC ... E01C 9/004; E01C 5/00; E01C 5/20; E02D 17/20; E02D 17/202; E02D 17/205; E02D 2200/165
USPC .......... 405/19, 16, 302.4, 302.7; 404/35, 36; 428/116, 131, 137
See application file for complete search history.

(56) References Cited

U.S. PATENT DOCUMENTS

| | | | | |
|---|---|---|---|---|
| 4,804,293 A | * | 2/1989 | Varkonyi | E02B 3/126 405/15 |
| 8,734,049 B1 | * | 5/2014 | Stiles | E01C 11/24 404/36 |
| 2009/0142542 A1 | * | 6/2009 | Halahmi | E02D 17/20 428/116 |
| 2010/0080659 A1 | * | 4/2010 | Halahmi | E02D 17/18 405/302.4 |
| 2017/0145651 A1 | * | 5/2017 | Azarkh | E02D 17/20 |

\* cited by examiner

*Primary Examiner* — Carib A Oquendo
(74) *Attorney, Agent, or Firm* — Jones Walker LLP

(57) ABSTRACT

A ground stabilization grid which includes a series of polygonal shaped cells having "x" sides. The cells are formed by polymer walls having a wall height of between about 1" and about 6". Each cell shares a common wall section with at least two adjacent cells; and a majority of cells within the grid includes at least two reinforcing ribs extending across the cell to engage opposing walls of the cell. The reinforcing ribs are characterized by (i) engaging the cell walls between about 25% and about 75% of the wall height, and (ii) extending between different opposing walls of the cell.

15 Claims, 7 Drawing Sheets

GROUND STABILIZATION GRID

I. BACKGROUND

Various types of ground stabilizing systems are known in the art. One such ground stabilizing system is the Dupont™ Plantex® Groundgrid® which is formed of a plastic, expandable honeycomb grid structure. The expanded honeycomb grid is positioned on a ground surface and gravel placed in the cells of the grid. However, these types of stabilization systems can be improved by making the grid itself more structurally stable. This is particularly the case if the grid is going to be used in combination with curable load bearing materials such as concrete.

II. SUMMARY OF SELECTED EMBODIMENTS OF INVENTION

One embodiment of the invention is a ground stabilization grid which includes a plurality of polygonal shaped cells having "x" sides. The cells are formed by polymer walls having a wall height of between about 1" and about 5". Each cell shares a common wall section with at least two adjacent cells; and a majority of cells within the grid includes at least two reinforcing ribs extending across the cell to engage opposing walls of the cell. The reinforcing ribs are characterized by (i) engaging the cell walls between about 25% and about 75% of the wall height, and (ii) extending between different opposing walls of the cell.

Another embodiment is a method of producing a ground stabilized pad. The method begins with positioning on a surface a stabilization grid. The grid includes (i) a plurality of closed cells formed by polymer walls having a wall height, each cell sharing a common wall section with at least two adjacent cells; and (ii) substantially each cell including at least one reinforcing rib extending across the cell to engage opposing walls of the cell, the reinforcing ribs engaging the cell walls between about 25% and about 75% of the wall height. The next step of the method is filling the cells with a load bearing material.

III. BRIEF DESCRIPTION OF THE DRAWINGS

IV. DETAILED DESCRIPTION

Figure 1A:
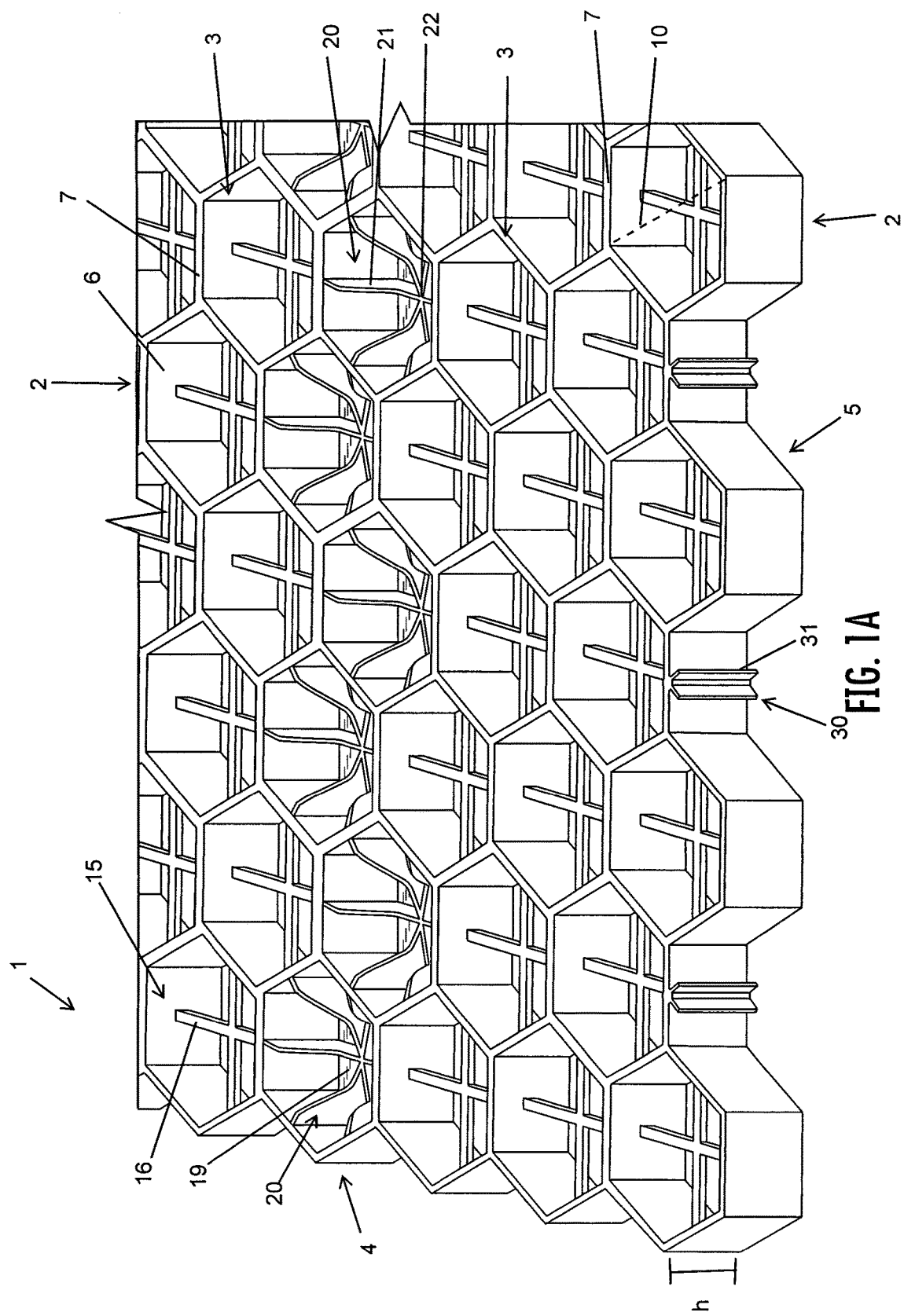
FIG. 1A is a perspective view of one embodiment of the stabilization grid of the present invention.

FIG. 1A illustrates one embodiment of the stabilization grid 1 of the present invention. Generally, stabilization grid 1 will comprise a plurality of closed cells 2 formed by a series of walls 6. The cells 2 will either be cells on the perimeter of grid 1 (perimeter cells 4) or cell inside the perimeter (interior cells 3). Each of the walls of the interior cells 3 has a common wall 7 shared with an adjacent cell. The perimeter cells 4 will typically have a common wall 7 with at least two other cells. While the cells 2 can take on virtually any closed shape, in many embodiments, the cells are polygonal in shape. In other words, a closed shape having at least three straight sides and angles between the sides. Such polygonal cells could have 3 (triangle), 4 (rectangle), 5 (pentagon), 6 (hexagon), 7 (heptagon), or 8 (octagon) sides. The figures illustrate hexagon cells. Each side or wall of the cells have a height "h", which in preferred embodiments can range between 1" and 6" (or any sub-range in between), but in specialized embodiments, could be less than 1" or greater than 6". The width or "diameters" of the cells could vary significantly from embodiment to embodiment. In the case of hexagon shaped cells such as in FIG. 1A, the maximum corner to corner distance 10 across the cell (i.e., distance between furthest spaced corners) is between about 3" and about 12" (or any sub-range in between). Again, in specialized embodiments, this corner to corner distance could be less than 3" or more than 12". The thickness of the cell walls could vary depending on material or design loads, but typically the cell wall thickness will range from 0.5 mm to 10 mm (or any sub-range in between).

In preferred embodiments, the cell walls will be formed of a polymer material. Nonlimiting examples may include polypropylenes, polyesters, or combinations thereof. Polymer materials can also include fiber reinforced polymer materials, e.g., resins which form polymers after polymerization or curing, e.g., fiberglass. In still other embodiments, it is conceivable the cell walls could be formed of ceramics or even metals.

Figure 2:
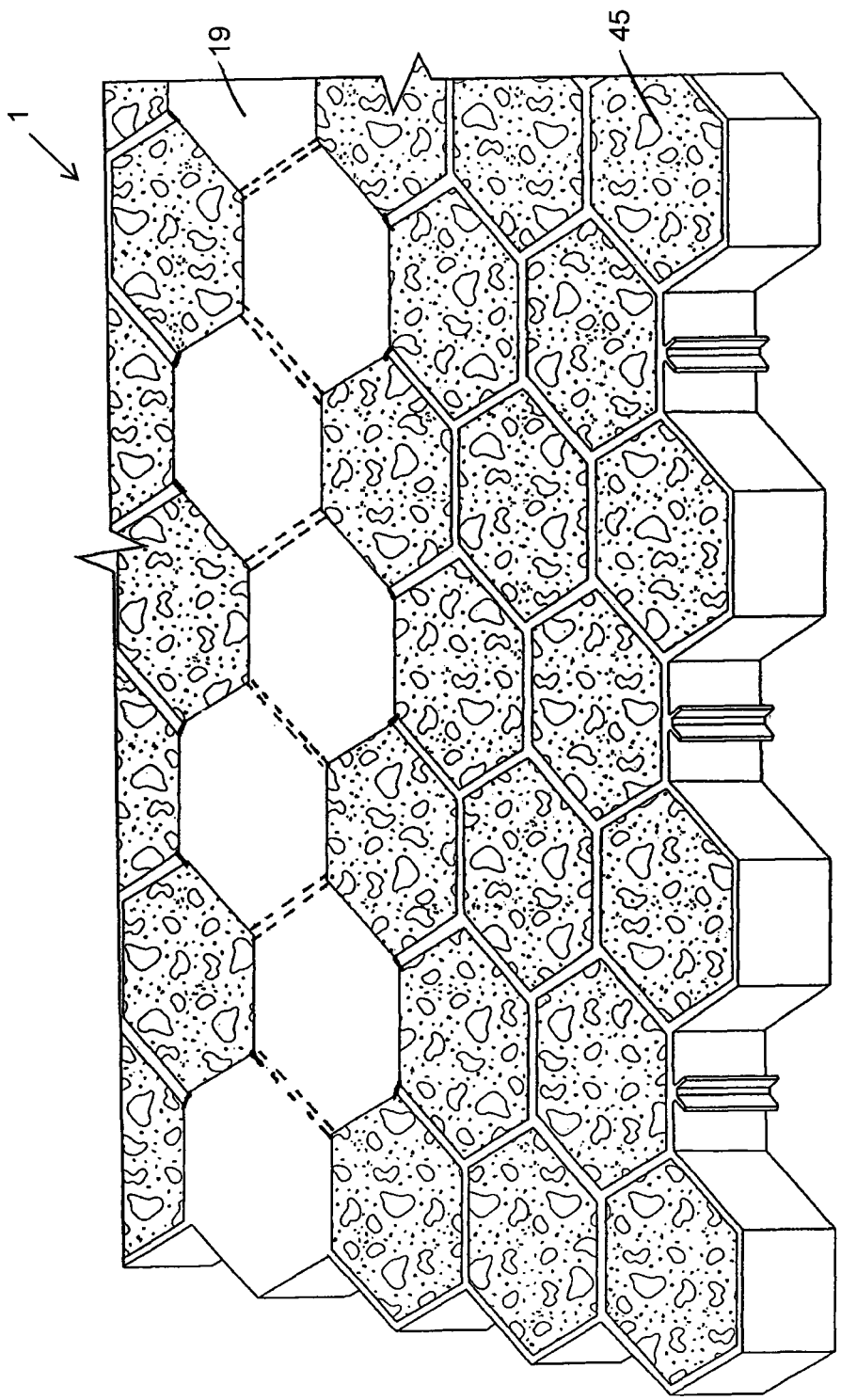
FIG. 2 is a perspective view of the opposite side of the FIG. 1A stabilization grid after concrete has been added to the grid cells.

FIG. 1A illustrates what will be considered the underside of the grid 1 or side that will be facing the ground in many applications. Thus, FIG. 1A shows all the cells 2 having open bottoms. Likewise, a majority of the cells in FIG. 1A have open tops. However, in the FIG. 1A embodiment, a minority of the cells will have closed tops 19, i.e., a top cell surface formed of the same polymer material as the cell walls 6. FIG. 1A shows the underside of closed tops 19 while the "upper" surfaces of closed tops 19 are seen in FIG. 2. In the illustrated embodiments, only a single line of cells within the grid section is formed with closed tops 19. Grid 1 will typically have closed tops 19 when it is designed to attach a geofabric or other material over grid 1 as is explained below. In embodiments where no material will overlay grid 1, it may be more desirable to provide a grid 1 that has no closed top cells.

FIG. 1A also demonstrates how the cells 2 in the disclosed embodiments will have some type of reinforcing rib 15 extending across the cell. The cells 2 having open tops and bottoms will have straight-bar ribs 16. The FIG. 1A embodiment shows each cell with two straight-bar ribs 16 arranged in an intersecting cross pattern. However, other embodiments could have a single straight-bar rib or more than two straight-bar ribs, e.g., six ribs for the hexagon cell seen in the figures. In preferred embodiments, the ribs 16 will be attached to the cell walls at approximately the middle height (e.g., at about 50% of the height "h" seen in FIG. 1A). In other embodiments, the reinforcing ribs 16 will engage the walls at between about 25% and about 75% of the wall height. In other words, the ribs 16 will engage the cell walls at least 0.25 (h) above the bottom opening of the cell and at least 0.25(h) below the top opening of the cell. Still further embodiments will have the reinforcing ribs 16 engaging the walls at between about 15% and about 85% of the wall height. In the illustrated embodiments, the cross-sectional area of a rib 16 can vary between about 0.5 mm² to about 100 mm² (or any subrange therebetween).

The cells having closed tops 19 are shown with a different rib configuration, fin-shaped ribs 20. Fin-shaped ribs 20 include wall connecting section 21 which attaches along the length of the cell walls, and a joint connecting section 22 which attaches along the inner or "bottom" surface of closed tops 19 and join with the other ribs 20 at the center of top 19. In the illustrated embodiment, a fin-shaped rib attaches at each wall of the cells with closed tops 19, but other embodiments could have ribs attached to less than each wall in the cell. The fin-shaped ribs 20 provide extra rigidity to these cells because the cells with closed tops typically will not be filled with a load bearing material as described further below. Cells with fin-shaped ribs 20 will have at least twice as much total reinforcing material (by cross-sectional area of the ribs) as cells with the straight-bar ribs 16.

Figure 1B:
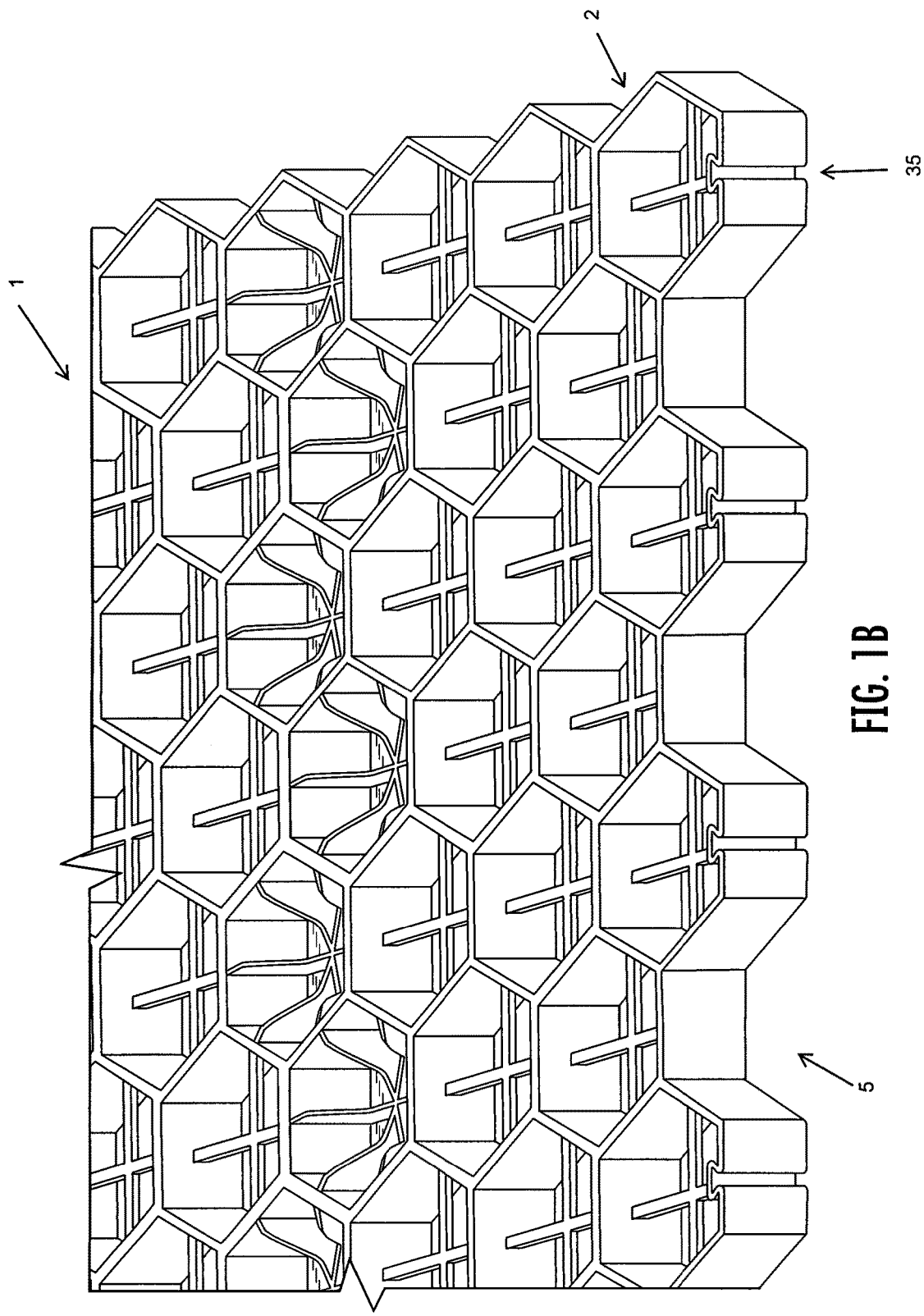
FIG. 1B is a perspective view of the FIG. 1A stabilization grid rotated 180°.

In many embodiments, the grid 1 will be of a size to allow them to be easily transported and handled by workers, e.g., 3'×3', 4'×6', etc. Thus, to cover a large area with the grid structure, it is advantageous to have individual grid sections connect to one another. The FIG. 1A grid 1 includes such a means for attaching or interlocking additional grids to it. FIG. 1A shows how the outer wall of certain perimeter cells may include locking arms 30 which are formed by two arm extensions 31 having a length approximate the cell height and oriented at about 45° with respect to the wall surface from which they extend. FIG. 1B shows the opposite end of grid 1 with the perimeter cells having locking grooves 35 configured to mate with locking arms 30. It can be seen that the locking arms 30 and locking grooves 35 are positioned in a staggered configuration or orientation, i.e., the locking arms 30 are offset one cell from the locking grooves 35 such that they may interlock. It can be seen that the grid perimeters, in essence, create alternating half-cell structures 5 which form a continuous row of cells when joined with an adjacent grid section.

Figure 3:
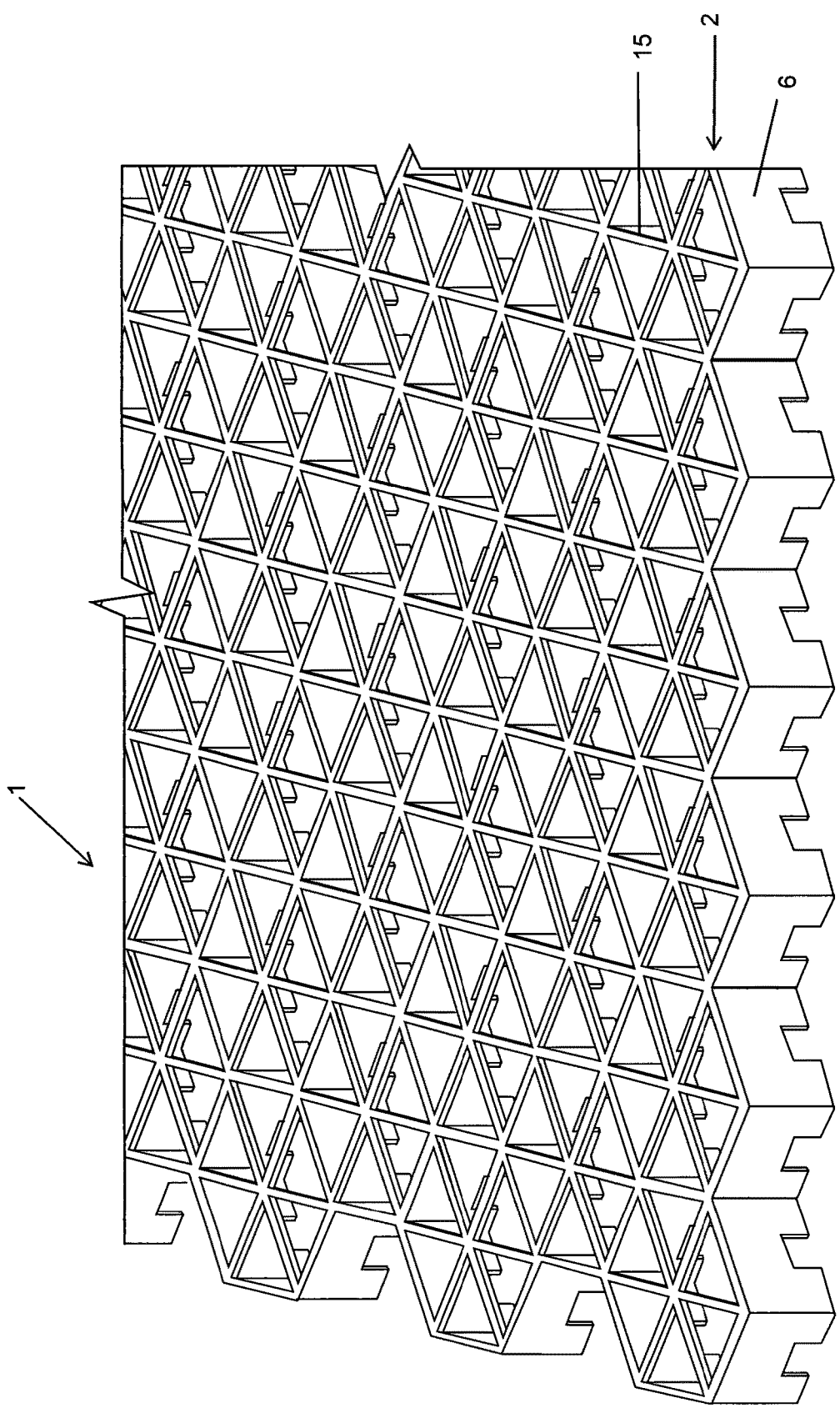
FIG. 3 is a perspective view of an alternative embodiment of the ground stabilization grid.
Figure 4:
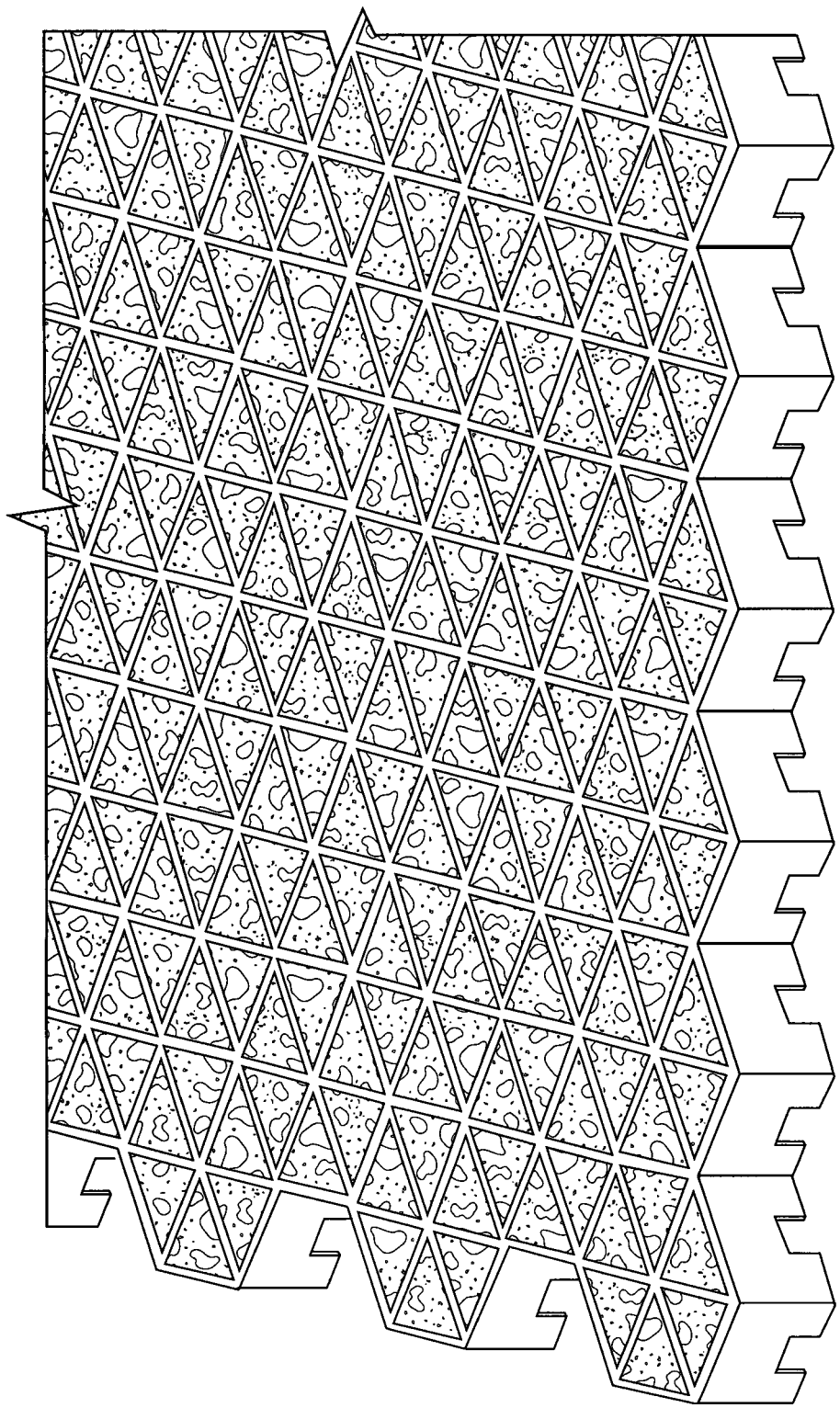
FIG. 4 illustrates the FIG. 3 embodiment with concrete placed in the cells of the grid.

A somewhat modified version of the grid structure is seen in FIGS. 3 and 4. FIG. 3 illustrates a grid structure 1 which is again composed of joined cells 2 formed by walls 6 shaped into interconnected hexagon closed cells. Again, FIG. 3 is a view of what would normally be considered the "bottom" surface of the grid structure. However, in the FIG. 3 embodiment, there are six reinforcing ribs 15 in each cell. Moreover, the ribs 15 attach at the bottom of the cell wall rather than a mid-point of the cell wall as seen in FIG. 1A. FIG. 4 shows the FIG. 3 grid structure filled with concrete, but not necessarily covering the ribs 15.

Another aspect of the present invention is a method of producing a ground stabilized pad using the stabilization structures described herein. This method generally comprises positioning the stabilization grid on a surface and then filling the cells of the structure with a load bearing material. Using the FIG. 1A embodiment as an example, multiple grid sections 1 will be connected together using the locking arms and locking grooves in order to create the desired surface configurations, e.g., a continuous elongated road surface, a rectangular parking surface, or the dimensions corresponding to a particular type of sports field. In many embodiments, the surface onto which the structure is placed will be some type of prepared ground surface, for example an area of compacted soil. This could be the case for a ground surface to be used as a motor vehicle travel surface (e.g., a roadway or parking area) or a surface to be used as a sports field where the stabilization pad is a base for an artificial turf system. The term "ground surface" is not limited to soil, but includes other surfaces previously existing on the ground, e.g., positioning the grid on a section of damaged pavement would be considered positioning on a "ground surface." Of course, the stabilization grid could be positioned on a ground surface having no previous preparation (e.g., native soil). Likewise, the stabilization grid could be positioned on surfaces not associated with the ground.

The load bearing material positioned within the grid cells can be any material which at least initially has a flowable state allowing it to fill the cells and can then support substantial loads, either immediately or after some period of curing. Sand and gravel are examples of load bearing materials which can support loads immediately after placement. Concrete is an example of a load bearing material which must cure prior to supporting a load. In many embodiments, the concrete used will be a conventional Portland cement based concrete having a cured strength of at least 2500 psi. However, in other embodiments, the load bearing material could be any material which is initially viscous, but later becomes solid upon curing, such as ceramic based concretes, resin based materials, or polymer based structural materials (also sometimes referred to herein as "solid-curable compositions").

Those skilled in the art will understand that the reinforcing ribs 15 extending across the cells provide increased structural strength and stability to the overall stabilization system once the load bearing material has been placed in the cells. Using Portland cement concrete as an example, once the concrete has cured, the reinforcing ribs not only enhance the load resistance of the concrete in the individual cells, but also increase the resistance of the concrete to failing in response to flexure loads being applied across the grid system. In certain embodiments employing concrete, e.g., employing the system as a vehicle traffic surface, sufficient concrete will be poured over the grid structure such that one or more inches of concrete cover the top of the cells.

As suggested above, one embodiment of the present invention is a method of producing a ground stabilized pad by positioning a stabilization grid on a surface and filling the cells of the grid with a load bearing material. In many embodiments, the stabilization grid is formed by interconnecting a series of grids using a connecting means such as seen in FIGS. 1A and 1B. When the ground stabilized pad is being employed as a surface to support vehicle traffic, the load bearing material could conceivably be sand or gravel, but more preferably will be concrete. In many instances when concrete is the load bearing material, sufficient concrete will be placed over the grid sections such that at least 0.5" or 1" of concrete covers the upper surface of the grid cell walls.

Figure 5:
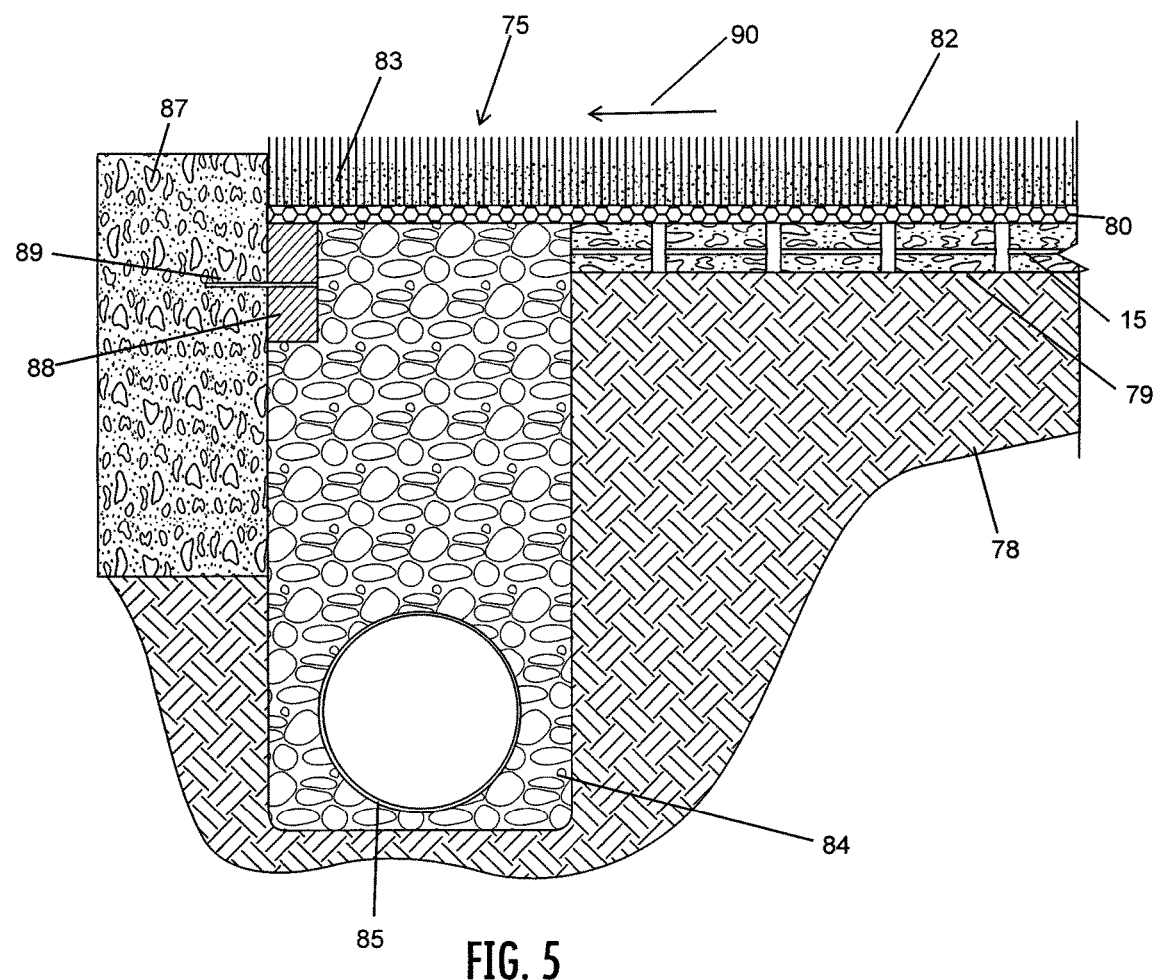
FIG. 5 illustrates the FIG. 1A stabilization grid employed in a turf system.

Other embodiments of the invention include an artificial turf system and a method of constructing the same. FIG. 5 illustrates one example of an artificial turf system 75 employing the stabilization grid seen in FIGS. 1A and 1B. Turf system 75 generally includes the stabilization grid 1 positioned on a compacted soil base, i.e., compacted subgrade 78. A water impervious liner 79 is positioned between subgrade 78 and grid 1. In the FIG. 5 embodiment, the cells of grid 1 have been filled with Portland cement concrete (e.g., at least 2500 psi compressive strength), but alternative embodiments could employ other load bearing materials, including gravel. The cells of grid 1 will be filled to their top edges as suggested in FIG. 2, leaving the closed tops 19 of the cells uncovered by the concrete. Positioned on top of the concrete filled grid 1 will be a drainage and shock attenuation blanket or layer 80. While the drainage blanket 80 can be any one of a number of conventional drainage materials or fabrics, in the FIG. 5 embodiment, drainage blanket 80 is a GeoFlo® drainage and shock attenuation blanket available for Global Synthetics Environmental, LLC of St. Gabriel, La. Typically, the drainage blanket 80 is not attached to the grid, but is comparatively free moving with respect to the grid. In certain situations, the drainage blanket may be lightly and temporarily tacked or stapled to the closed tops 19 of the grid (e.g., in a windy construction environment. However, the drainage blanket may be more securely and permanently attached to the closed tops 19 along the perimeter of the grid field. In a similar manner, an artificial turf layer 82 is placed over the drainage blanket layer 80, but not rigidly attached thereto except at the edges. Naturally, there can be applications where the closed tops 19 of all grids (not just the perimeter grids) can be used to more securely attach some type of cover layer or fabric (e.g., by stapling, tacking, or use of a glue or other adhesive compound). In a preferred embodiment, the artificial turf layer 82 may be a product such as GeoGreen® replicated grass also available from Global Synthetics Environmental, LLC. A granular polymer infill layer 83 is then applied to the artificial turf layer 82. In one example, the infill may be granularized rubber pellets ranging in size from about 1/32 to 1/8 inch in diameter.

FIG. 5 further illustrates how the ends of drainage blanket and turf layers will be enclosed by the concrete border curb 87. The border curb 87 will support a wooden nailer beam 88 via fasteners 89 extending through nailer beam 88 into border curb 87. The edges of the drainage blanket and turf layer may then be fixed to nailer beam 88 by way of air nails, air staples, or screws, etc. Adjacent to the border curb 87 will be the drainage channel 84 filed with aggregate such as No. 57 stone. The perforated drainage pipe 85 will be positioned at the bottom of drainage channel 84. Typically, the subgrade 78 will be formed to have a grade line 90 with at least a ½% slope falling toward the border curb 87. Thus, rainfall on the turf system will be directed via drainage blanket 80 toward the drainage channel 84 and ultimately into drainage pipe 85.

Figure 6:
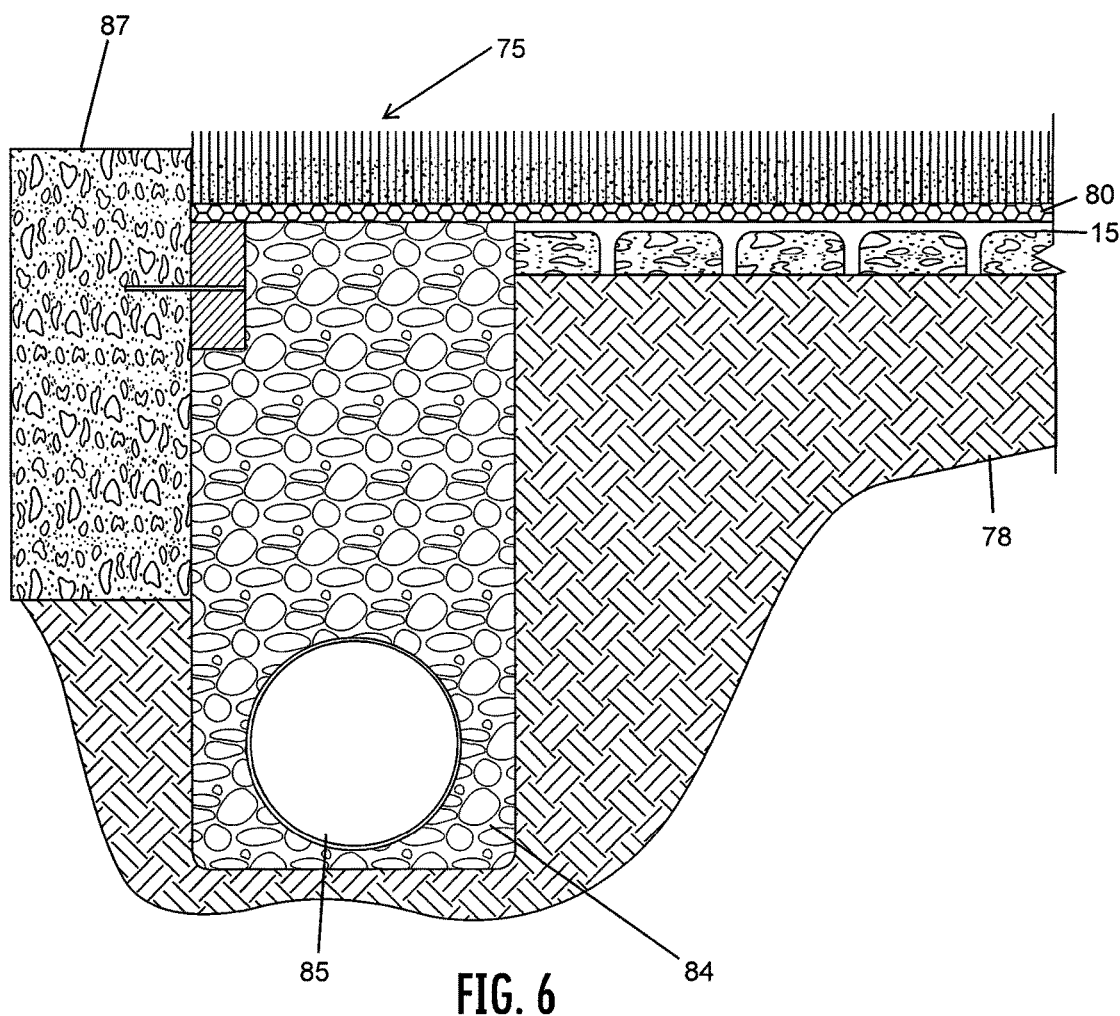
FIG. 6 illustrates the FIG. 3 stabilization grid employed in a turf system.

FIG. 6 illustrates a slightly different embodiment of artificial turf system 75. The FIG. 6 embodiment is substantially the same as described in reference to FIG. 5, but in FIG. 6, the grid system 1 seen in FIGS. 3 and 4 is employed. The grid surface seen in FIG. 4 will be placed against the subgrade surface and the cells filled with concrete. Naturally, the grid structures seen in FIGS. 1A to 4 are only two illustrative examples and artificial turf systems of the present invention could be constructed with many different grid configurations, particularly when the grid cells are being filled with concrete. As will be apparent from the above description, the grid 1 is left in place while the concrete completely cures and the grid becomes an integral part of the structural system (i.e., the grid is never removed after placement of the concrete).

The term "about" will typically means a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or even possibly as much as +/−20%.

The invention claimed is:

1. A ground stabilization grid comprising:
   (a) a plurality of polygonal shaped cells having "x" sides, the cells formed by polymer walls having a wall height of between about 1" and about 5";
   (b) each cell sharing a common wall section with at least two adjacent cells;
   (c) a majority of cells within the grid including at least two reinforcing ribs extending across the cell to engage opposing walls of the cell, the reinforcing ribs (i) engaging the cell walls between about 25% and about 75% of the wall height, and (ii) extending between different opposing walls of the cell.

2. The ground stabilization grid of claim 1, wherein the at least two reinforcing ribs are positioned substantially perpendicular to one another.

3. The ground stabilization grid of claim 1, wherein a majority of cells in the grid have open tops and bottoms.

4. The ground stabilization grid of claim 3, wherein a minority of cells in the grid have an enclosed top.

5. The ground stabilization grid of claim 4, wherein the cells with enclosed tops have at least twice the mass of reinforcing ribs as cells having open tops.

6. The ground stabilization grid of claim 1, wherein a first side of the grid includes a plurality of perimeter cells with outwardly extending locking arms and a second side of the grid opposing the first side includes a plurality of locking channels configured to receive the locking arms.

7. The ground stabilization grid of claim 6, wherein the cells with locking arms and the cells with locking channels are positioned in a staggered configuration.

8. The ground stabilization grid of claim 1, wherein the reinforcing ribs each have a cross-sectional area of between about 3 mm$^2$ and about 30 mm$^2$.

9. A method of producing a ground stabilized pad comprising the steps of:
   (a) positioning on a surface utilized for vehicle traffic a stabilization grid comprising:
      (i) a plurality of closed cells formed by polymer walls having a wall height, each cell sharing a common wall section with at least two adjacent cells;
      (ii) substantially each cell including at least one reinforcing rib extending across the cell to engage opposing walls of the cell, the reinforcing ribs engaging the cell walls between about 25% and about 75% of the wall height;
   (b) filling the cells with a Portland cement based concrete; and
   (c) allowing the concrete to completely cure while leaving the grid in place.

10. The method of claim 9, wherein the concrete has a strength of at least 2500 psi.

11. The method of claim 9, wherein (i) a first side of the grid includes a plurality of perimeter cells with outwardly extending locking arms and a second side of the grid opposing the first side includes a plurality of locking channels configured to receive the locking arms; and (ii) a plurality of grids are inter-locked together prior to placing concrete in the cells.

12. The method of claim 9, wherein sufficient concrete is placed over the grid to provide at least 1" of concrete cover over the top of the cells.

13. The method of claim 9, wherein the reinforcing ribs each have a cross-sectional area of between about 3 mm$^2$ and about 30 mm$^2$.

14. The method of claim 9, wherein a corner to corner distance across the cells is between about 3" and about 12".

15. The method of claim 9, wherein the reinforcing ribs engage the cell walls between about 40% and about 60% of the wall height.

* * * * *